United States Patent [19]

Baumberg

[11] Patent Number: 4,540,014

[45] Date of Patent: Sep. 10, 1985

[54] HYDRAULIC MEMORY DEVICE

[76] Inventor: Iosif Baumberg, 54 Bay 29 St., Brooklyn, N.Y. 11214

[21] Appl. No.: 573,607

[22] Filed: Jan. 25, 1984

[51] Int. Cl.$^3$ ............................................. F04F 10/00
[52] U.S. Cl. ................................... 137/123; 137/132; 137/142; 137/153; 137/803
[58] Field of Search .............. 137/123, 132, 133, 138, 137/142, 153, 803, 822, 825

[56] References Cited

U.S. PATENT DOCUMENTS

| | | | |
|---|---|---|---|
| 301,391 | 7/1884 | Reinecke | 137/142 X |
| 378,811 | 2/1888 | Tyler | 137/142 X |
| 462,654 | 11/1891 | Damron | 137/142 |
| 1,512,159 | 10/1924 | Brinton | 137/153 X |
| 1,661,202 | 3/1928 | Thayer | 137/142 X |
| 2,272,655 | 2/1942 | Briese | 137/142 X |
| 2,435,049 | 1/1948 | Minges | 137/153 |
| 2,791,232 | 5/1957 | Downs | 137/153 |
| 2,839,072 | 6/1958 | Leyva | 137/153 X |
| 2,959,184 | 11/1960 | Mahan | 137/142 X |
| 4,291,836 | 9/1981 | Chen-Hsiung | 137/132 X |

FOREIGN PATENT DOCUMENTS 500545 5/1976 U.S.S.R.
667964 6/1979 U.S.S.R.

*Primary Examiner*—Gerald A. Michalsky
*Attorney, Agent, or Firm*—Ilya Zborovsky

[57] ABSTRACT

A hydraulic memory device has two elongated passages for liquid, an input member connected with upper ends of the elongated passages for liquid supply into the latter, and two output members each connected with a lower end of the respective passage, wherein the output members are formed so that a portion of liquid supplied in a preceding step remains in one curved output member, and during a subsequent step of liquid supply the liquid will flow into an elongated passage provided with the other output member.

13 Claims, 13 Drawing Figures

HYDRAULIC MEMORY DEVICE

BACKGROUND OF THE INVENTION

The present invention relates to a hydraulic memory device to be used in a fluid technology and can be used for synthesis of automated control systems in industry and in agriculture, particularly in dripping irrigation.

Hydraulic memory devices are known in the art. Some of these devices are disclosed, for example, in Soviet inventor's certificates Nos. 500,545 and 667,964. The common disadvantage of the known devices is that for all designs, such as electromechanical, electronic, optical, magnetic, pneumatic and hydraulic, a trigger with a complementing (counting) input cannot be simultaneously used as a trigger (flip-flop) with two inputs, and vice versa. The other disadvantage is a loss (erasing) of memory of the devices after shutting off of them from a supply source. Finally, a further disadvantage of the known devices is that a channel of supply of a feeding stream cannot be used for supplying of a control signal.

SUMMARY OF THE INVENTION

Accordingly, it is an object of the present invention to provide a hydraulic memory device which avoids the disadvantages of the prior art.

More particularly, it is an object of the present invention to provide a hydraulic memory device which can perform the functions of both a trigger with one complementing input and a trigger with two inputs, in which memorized information is not erased after shutting off of a feeding stream, and in which a control signal can be supplied through a liquid supply channel.

In keeping with these objects and with others which will become apparent hereinafter, one feature of the present invention resides, briefly stated, in an hydraulic memory device which has two elongated passages, a liquid input member connected with an upper end of the passages, and two liquid output members each connected with a lower end of the respective passage and formed so that when during a preceding liquid supply a liquid was flowing through one passage, a small amount of liquid remains in the curved output member of said one passage, and therefore during a subsequent liquid supply the liquid will flow into the other passage, as will be explained hereinbelow.

The novel features of the invention are set forth in particular in the appended claims. The invention itself, however, will be best understood from the following description of a preferred embodiment which is accompanied by the following drawing.

DESCRIPTION OF A PREFERRED EMBODIMENT

Figure 1:
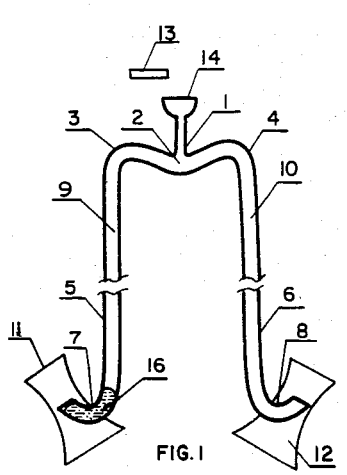
FIGS. 1–12 are schematic views showing passage of a liquid through a hydraulic memory device in accordance with the present invention, at different stages of said liquid passage.

A hydraulic memory device in accordance with the present invention has an input member for supplying a liquid stream, which is formed as a pipe 1 with a substantially vertical axis. The lower end of the pipe 1 is connected with a connecting portion 2 of two short arms 3 and 4 of two passages or siphons 5 and 6 which are advantageously symmetrical. Ends 7 and 8 of long arms 9 and 10 of the siphons 5 and 6 are curved so that their openings face upwardly. The upwardly open openings of the ends or output members 7 and 8 are located in the region of narrowing of two injectors 11 and 12. A channel of supplying of a control signal to a complementing (counting) input of the device or trigger is formed as a nozzle 13 with an axis which intersects the axis of the pipe 1. The nozzle 13 is located above a funnel-shaped portion 14 of the pipe 1. The axes of the long arms 9 and 10 of the siphons 5 and 6 extend substantially vertically.

The hydraulic memory device in accordance with the present invention operates in the following manner.

A feed liquid 15, for example water, flows through the funnel-shaped portion 14 and the pipe 1 into the connecting portion 2 of the short arms 3 and 4 of the siphons 5 and 6. The value of instantaneous flow rate (consumption) of the feed liquid must be smaller than the value of passing-through of the long arm 9 or 10 of the siphons 5 and 6, and the liquid must fill the cross section of the pipe 1 so as to prevent gas (air) entrance of the surrounding atmosphere into the siphons through the pipe 1. The upwardly curved end 7 of the long arm 9 of the siphon 5 is filled with a liquid 16 which has remained as a result of preceding passage of the liquid stream through the long arm 9 of the siphon 5, as shown in FIG. 1.

Figure 2:
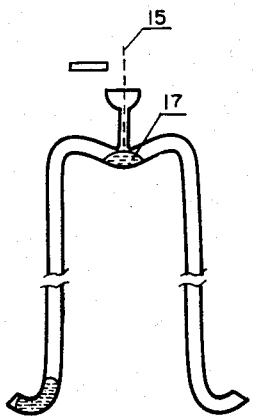

As the liquid accumulates in the connecting portion 2 of the short arms 3 and 4 of the siphons, the cross section of the passages (FIG. 2) is overlapped, and during a subsequent liquid supply the pressure onto the liquid from the side of the long arm 9 of the siphon 5 will exceed the pressure of gas onto the liquid from the side of the long arm 10 of the siphon 6, since the end 7 of the siphon 5 is filled with liquid 16. As a result of increase of the pressure differential acting upon the liquid in the short arms 3 and 4, the liquid will flow in the direction of the long arm 10 of the siphon 6 (FIG. 3) and partially will pass into the long arm 10 of the siphon 6, because the height of the liquid column in the upwardly curved ends 7 and 8 of the siphons 5 and 6 is greater than the height of the liquid column in the short arms 3 and 4 connected by the connecting portion 2.

Figure 4:
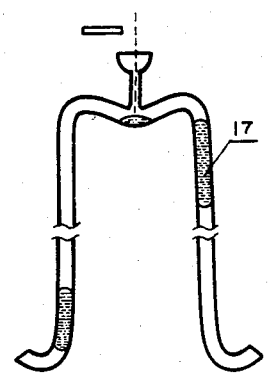
Figure 5:
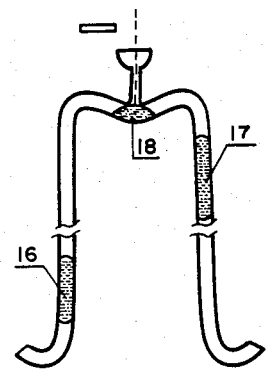
Figure 6:
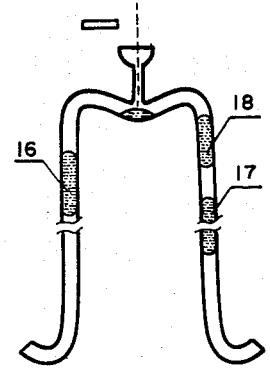
Figure 7:
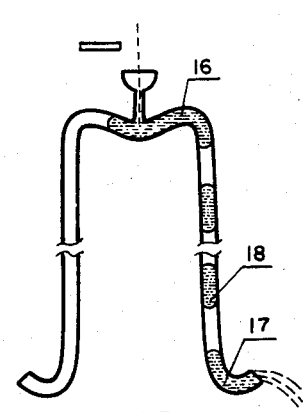

As the liquid is supplied further, the mass and height of the formed liquid bar in the arm 10 will exceed the respective value of liquid quantity 16 in the end of the long arm 9 of the siphon 5, the liquid 17 in the long arm 10 of the siphon 6 will start to lower, and the liquid 16 in the long arm 9 of the siphon 5 will start to raise (FIG. 4). After a certain time period in the connecting portion 2 of the short arms 3 and 4 a new portion of liquid 18 will accumulate. When the latter overlaps the cross section of the siphons (FIG. 5), under the action of mass of the higher liquid bar 17 and a kinetic energy obtained during the downward movement in the long arm 10 of the siphon 6, the liquid portion 18 will pass into the long arm 10 (FIG. 6). This process will continue until the liquid portion 16 pass through the short arms 3 and 4 of the siphons and will flow into the long arm 10 of the siphon 6 (FIG. 7).

During accumulation in the portion 2 of a portion of liquid such that the cross section of the arms of the siphons 3 and 4 is overlapped, a new formed portion of liquid displaces under the action of energy of the lowering liquid portion in the long arm 10 of the siphon 6 into the long arm 10. Thus, the liquid supplied into the pipe 1 will discharge through one of the output members which in this case is the open end of the long arm of the siphon 6.

Figure 3:
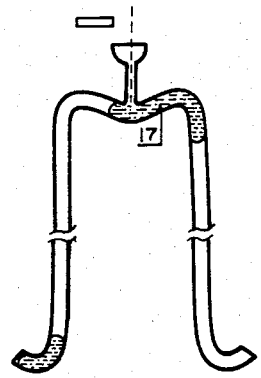
Figure 8:
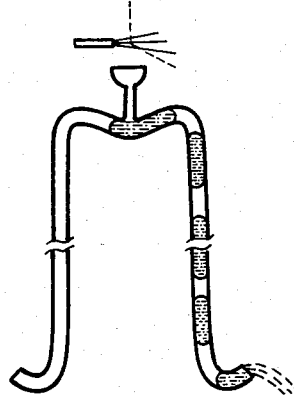
Figure 9:
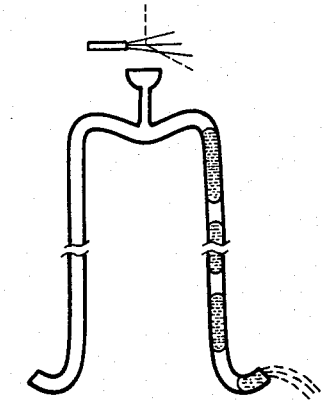
Figure 10:
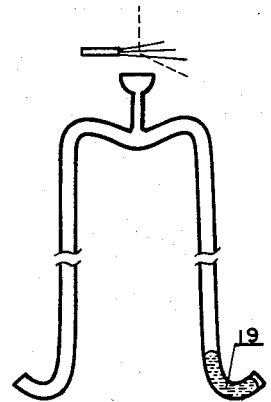
Figure 11:
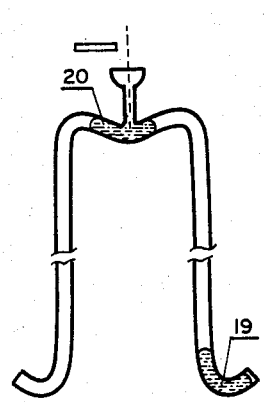
Figure 12:
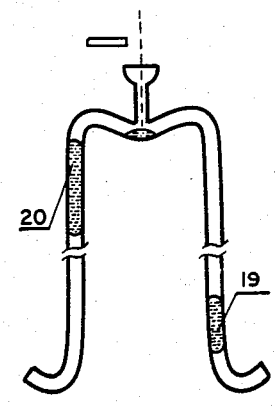

A control signal for the trigger with a complementing input is supplied through the nozzle 13 as an impulse of a pneumatic or hydraulic stream. It interacts with the liquid supply stream so as to deviate the direction of the latter. As a result of this, the liquid supply is interrupted into the pipe 1 (FIGS. 8 and 9). After termination of the action of the control signal, the curved end 8 of the long arm 10 of the siphon 6 remains filled with liquid 19 (FIG. 10). As the liquid is supplied into the connecting portion 2 between the short arms 3 and 4 of the siphons 5 and 6, a portion 20 of liquid starts to displace in the direction of the long arm 9 of the siphon 6 (FIGS. 11 and 12), analogously as it took place before the supply of the control signal (FIGS. 3 and 4). However, the direction of flow of liquid in the siphons has changed to an opposite one. This is the beginning of the change of direction of the liquid stream which will discharge from the open end 7 of the siphon 9. Thus, for the change of direction of the stram of liquid it is sufficient to shut off the supply of liquid into the pipe 1 for a short time.

This can be carried out both by the interaction of the control signal or stream with the supply stream, and also by short time interruption of the liquid supply into the pipe 1. In the last case the control signal in actually supplied through a channel of supply of feed liquid. Duration of the control signal must be sufficient for providing a discharge of the formed liquid portion out of the long arms 9 and 10 of the siphons 5 and 6, with the exception of the residual portion of liquid 16 or 19 which remains in the curved part 7 or 8 of the long arms of siphons.

Resumption of the liquid supply after a long pause will not lead to a loss of memory or information. After the beginning of the liquid supply the liquid will flow in the direction which is opposite to the direction of flow before the interruption of the supply stream in the pipe 1. Duration of storage of memory about the direction of liquid stream before the interruption of liquid supply depends only on the duration of storage of the residual liquid portion 16 or 19 in the curved ends 7 or 9 of the long arms of the siphons 5 and 6, in a quantity sufficient for overlapping (closing) of the cross section of the siphons.

For the utilization of the device as a trigger (flip-flop) with two inputs, control signals are supplied to the inlets of the injectors 11 and 12, depending upon the required direction of liquid stream at the output of the device. This is carried out similarly to the manner of operation described in the Soviet inventor's certificate No. 667,964.

Thus, the inventive hydraulic memory device has three control inputs including one complementing input 13 for a trigger with one input and two inputs 11 and 12 for a trigger with two inputs, as well as two outputs for both triggers. It also has one input of a liquid supply 1. The device can be used as a trigger with a complementing input and with two inputs, with common for both triggers outputs. If the device is used only as a complementing trigger with one input, the injectors 11 and 12 can be dispensed with.

Figure 13:
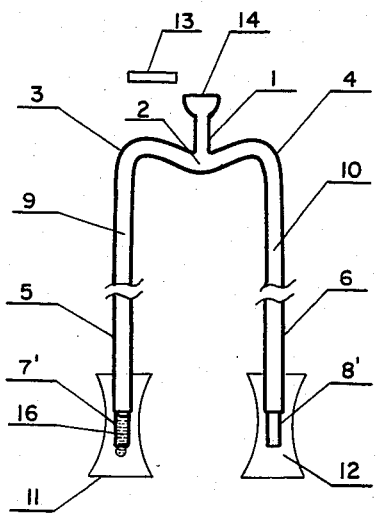
FIG. 13 shows another embodiment of the device.

FIG. 13 shows the hydraulic memory device in accordance with a further embodiment of the invention. Here ends 7' and 8' of long arms 9' and 10' of the siphons 5' and 6' are not curved. The ends 7' and 8' are however of such a cross sectional area that the liquid wets the inner surface of the ends and after termination of the preceding liquid supply a small quantity of liquid remains in the end 7' or 8' of the siphon 5' or 6' through which the liquid was flowing during this preceding liquid supply. For example for water, the inner diameter of the ends 7',8' must not exceed 4 mm, for gasoline—3 mm, if the ends are composed of glass. The ends 7' and 8' can be made of a material different from the material of the remaining part of the siphons to increase the wetting action. The operation of the device shown in FIG. 13 is the same.

The invention is not limited to the details shown since various modifications are possible within the invention.

What is desired to be protected by Letters Patent is set forth in the appended claims.

I claim:

1. A hydraulic memory device, comprising
   two substantially upright liquid-conducting passages each having upper and lower ends;
   a liquid input member communicating with the upper ends of said passages for supplying a liquid into the latter;
   two liquid output members each connected with the lower end of a respective one of said passages so as to receive the liquid from the respective passage into the respective liquid output member and to discharge the liquid from the latter; and
   liquid retaining means in each of said liquid output members and formed so that if during a preceding liquid supply the liquid was flowing through one of said passages a small quantity of the liquid remains in the liquid output member connected with said one passage, and therefore with delivery of a control signal in the region of said liquid input member during a subsequent liquid supply the liquid will be flowing through the other of said passages, and vice versa, so as to provide operation of the device as a trigger with one control input and two outputs.

2. A hydraulic memory device as defined in claim 1, wherein said output members have an inner cross section with a dimension selected so that the small quantity of liquid remains in the output member of said one passage after termination of the preceding liquid supply, because of wetting by the liquid of an inner surface of said output members, forming said liquid retaining means.

3. A hydraulic memory device as defined in claim 2, wherein said output members are composed of a material which is different from the material of the liquid-conducting passages so as to increase the wetting by the liquid of the inner surface of said output members.

4. A hydraulic memory device as defined in claim 1, wherein said output members are curved upwardly so that the small quantity of liquid remains in the output member of said one passage after termination of the preceding liquid supply, forming said liquid retaining means.

5. A hydraulic memory device as defined in claim 4, wherein said curved output members are curved in opposite directions away from one another.

6. A hydraulic memory device as defined in claim 4, wherein said curved output members are curved in the same direction toward one another.

7. A hydraulic memory device as defined in claim 4, wherein said curved output members are curved in different planes.

8. A hydraulic memory device as defined in claim 1, wherein said liquid input member is substantially vertical and has a lower end connected with said upper ends of said passages.

9. A hydraulic memory device as defined in claim 1; and further comprising a first control impulse delivering element arranged for delivering a control signal in the region of said liquid input member.

10. A hydraulic memory device as defined in claim 9, wherein said first control signal delivering element is formed as a liquid supply nozzle having a substantially horizontal axis and located above said liquid input member.

11. A hydraulic memory device as defined in claim 10, wherein said liquid input member has an upper end, said liquid supply nozzle being located above said end so as to interrupt a supply of liquid into said liquid input member by a liquid stream issuing from said liquid supply nozzle.

12. A hydraulic memory device as defined in claim 1; and first comprising two second control signal delivering elements each arranged for delivering a control signal in the region of a respective one of said liquid output members, so as to also provide operation of the device also as a trigger with two control inputs.

13. A hydraulic memory device as defined in claim 12, wherein said second control signal delivering elements are formed as two injectors each having a narrow portion and located so that each of said liquid output members is located in the narrow portion of a respective one of said injectors.

* * * * *